April 27, 1965 K. LE SAINT ETAL 3,181,134

MOVING EVENTS DISPLAY DEVICE

Filed March 22, 1963 5 Sheets-Sheet 1

INVENTOR.
KENNETH LESAINT
LINSAY A STOLL
BY
Joseph A. Rave
Attorney

April 27, 1965 K. LE SAINT ETAL 3,181,134
MOVING EVENTS DISPLAY DEVICE
Filed March 22, 1963 5 Sheets-Sheet 3

INVENTOR.
KENNETH LE SAINT
LINSAY A. STOLL
BY
Joseph A. Rave
Attorney

April 27, 1965   K. LE SAINT ETAL   3,181,134
MOVING EVENTS DISPLAY DEVICE
Filed March 22, 1963   5 Sheets-Sheet 4

Fig. 7

INVENTOR.
KENNETH LESAINT
BY LINSAY A. STOLL

Joseph A. Rave
Attorney

United States Patent Office 3,181,134
Patented Apr. 27, 1965

3,181,134
MOVING EVENTS DISPLAY DEVICE
Kenneth Le Saint and Lindsay A. Stoll, Cincinnati, Ohio, assignors to Avco Corporation, Cincinnati, Ohio, a corporation of Delaware
Filed Mar. 22, 1963, Ser. No. 267,280
4 Claims. (Cl. 340—309.4)

This invention relates to improvements in a moving events display device, that is, a device for automatically tracking time and/or distance for informing an observer of time remaining to a given event, time elapsed since a given function, and/or distance traveled in said time interval.

The device of the present invention has numerous uses in fields that are unrelated to one another such as advising progressive time intervals and distance traveled in the sum of said intervals and the time and distance to go to a given point. A specific example of this use would be the spotting of a flying object, a given distance and time from a point of landing, setting this information into the device and having the device automatically and continuously inform the observer of the decrease in time and decrease in distance that the said flying object is from its point of landing, rendezvous or observation. Conversely, a flying object may have its flight initiated and this information imparted to the device and which then automatically at given intervals informs the observer of the time elapse and the distance traveled since commencement of flight of the object.

Another use for the device of the present invention would be in the carrying forward of manufacturing processes and wherein different steps in the process, such as adding ingredients or raising or lowering temperature, are to be effected at definite time intervals and with the device indicating the completion of those time intervals. Other uses of the device are hereinafter set forth.

The principal object of the present invention is, therefore, the provision of a device that may be designated as "a traveling memory" or "moving events display" device that either subtracts intelligence from or adds intelligence to the initial point at which the memory or event was started.

Another object of this invention is the provision of a device that accomplishes the foregoing object but which can have the memory erased if for some reason it is desired not to continue the same and, conversely, the said memory may be initiated at any point along a tracking or recording path.

A further object of the present invention is the provision of a device for accomplishing the foregoing objects and which device simultaneously completes a memory track or a recording record of a plurality of individual events.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

FIG. 3 is a further enlargement and sectional view of a portion of FIG. 2 taken substantially centrally of FIG. 2 and showing in clear detail the operating structure.

Throughout the several views of the drawings similar reference characters are employed to denote the same or similar parts.

As noted above the device of the present invention is adapted to act as a moving events display or as an indicator of present action and keep an observer continuously informed of the progress of the action.

As will later be more specifically pointed out the device of the present invention may be arranged and used to continuously inform an observer of the approach of an airplane to a landing field. At the same time the observance of other airplanes flying toward the field, or point of observation, can have their flying progress individually and independently charted. This record can be commenced at any point within the range of the device and if two or more planes are approaching the landing field, or point of observation, their independent progress can be charted and observed even though they are each a different distance from the field and thereby requiring different elapsed time intervals to the landing point and their individual progress continuously observed and noted.

Figure 1:
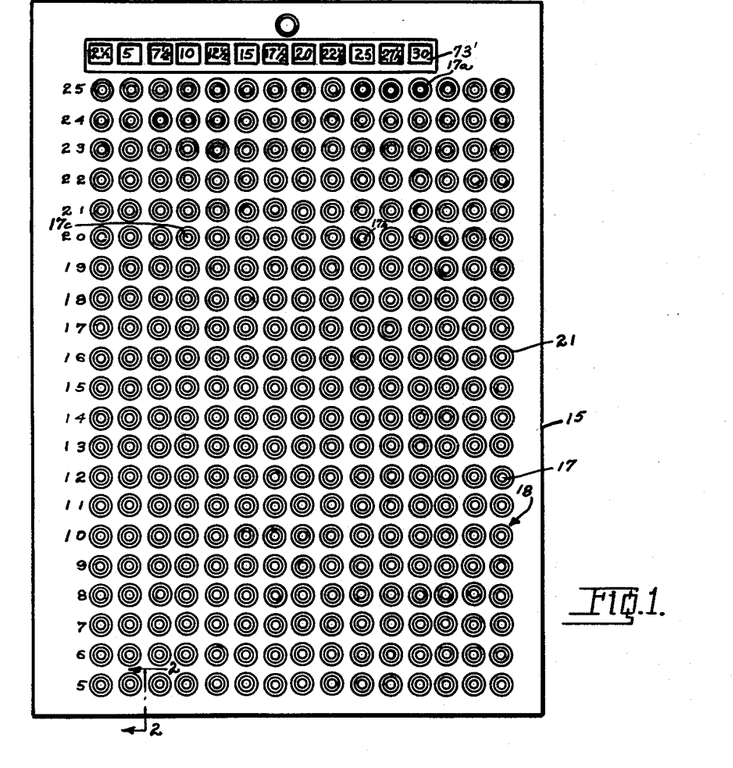
FIG. 1 is a front elevational view of a device for accomplishing the objects of the present invention, namely, a device for continuously and progressively informing an observer of the action taking place between two known points.
Figure 2:
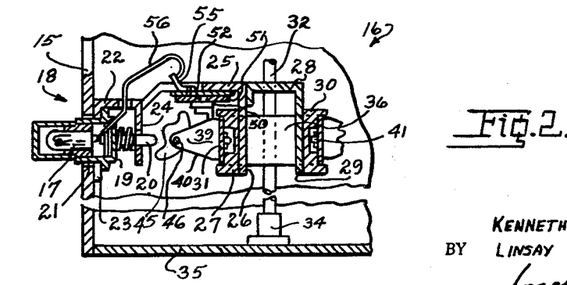
FIG. 2 is an enlarged, fragmentary, sectional view through a portion of the device of FIG. 1 showing a mechanism whereby the invention may be accomplished as seen from line 2—2 on said FIG. 1.

Specifically and as shown in FIG. 1 use is made of a panel 15 which conveniently may be the front of a box or cabinet 16, see FIG. 2. The cabinet front or panel 15 has mounted thereon a plurality of horizontal rows of lamps 17 with each lamp in each row vertically aligned to provide vertical columns and which lamps may take any convenient form with the lamps in a horizontal row employed to indicate the progression of the moving event in the tracking or control sequence.

As shown in FIG. 2 the said lamps 17 may each be a removable part of a switch operating mechanism indicated in its entirety by the reference numeral 18 and which switch operating mechanism includes a plunger body portion 19 from which projects, per se, a plunger 20. The plunger body portion 19 is mounted for sliding movement through an aperture 21 in the cabinet front or panel 15 and preferably is associated with a bracket 22 secured through a depending flange 23 to the inner face of the said cabinet front or panel 15. The bracket 22 is illustrated as a U or channel shaped with a second flange 24 inwardly spaced from the first flange 23 and downwardly projecting. An inwardly projecting horizontal arm 25 from the flange 24 has at its inner edge a depending flange 26 to the outward face of which is secured a track 27.

The bracket flange 26 in turn supports a further bracket 28, inwardly of the bracket 25, with said bracket 28 also including a depending flange 29 carrying on its inner face a track 30.

It should be noted that the brackets 25 and 28 may be formed as a unitary construction and with the said brackets, or bracket, extending entirely across the inner face of the cabinet front or panel behind a horizontal row of lamps 17 and that there is a similar construction for each horizontal row of lamps 17 and with said brackets extending parallel to one another vertically of the cabinet front or panel 15.

The tracks or guides 27 and 30 are arranged in horizontal alignment with one another for supporting and guiding parallel reaches of an endless belt 31.

Figures 5, 6, 9:
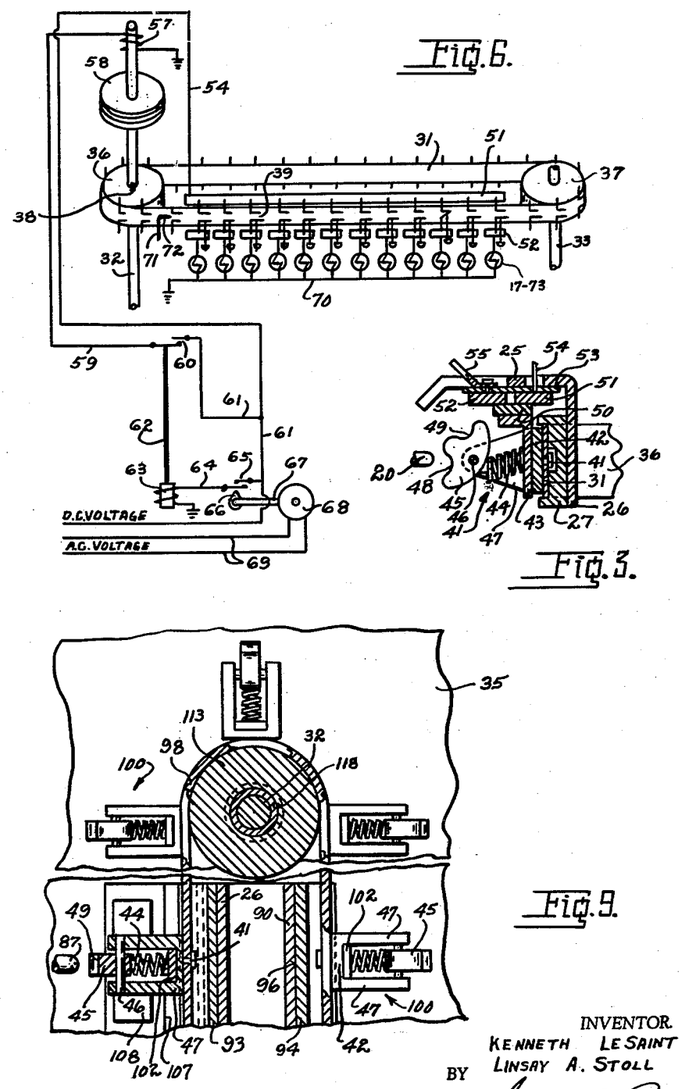
FIG. 5, similar to FIG. 2, is an enlarged, fragmentary, sectional view of a mechanical mechanism used in the operation of the device of FIG. 4, and as seen from line 5—5 on FIG. 4.
FIG. 6 is a diagrammatic view of a mechanical and electrical circuit that would function in the operation of the device of the present invention.
FIG. 9 is a fragmentary, sectional view on an enlarged scale of portions of FIG. 8 as seen from line 9—9 on said FIG. 8.
Figure 5:
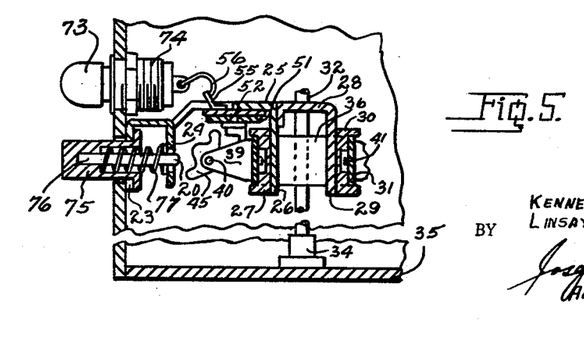

Upstanding at each side of the cabinet 16 are shafts 32 and 33, shown diagramatically in FIG. 6. Each of the shafts 32 and 33 is mounted for rotation in any suitable or desirable manner such as through a bearing 34, see FIG. 2, secured to the cabinet base or bottom 35. Secured, respectively, to the said shafts 32 and 33 are pulleys or belt drums 36 and 37 in transverse alignment and around which extends the endless belt 31, there being as many pulleys or belt drums on each shaft as there are horizontal rows of lamps. It should be noted that the pulleys or belt drums 37 may be freely rotatable on the shaft 33 while the pulleys or belt drums 36 are each secured to the shaft 32; for this purpose the said pulley or drum 36 is illustrated in FIG. 6 at 38 as keyed to the shaft 32.

As illustrated in FIG. 1 the lamps 17 are equally spaced from one another transversely of the cabinet front or panel 15. Secured to the belt 31 immediately behind and in alignment with each lamp 17 is a switch mechanism indicated in its entirety by the reference numeral 39 and a description of one such switch mechanism will suffice for all.

The switch mechanism 39 is a commercial product and may take any acceptable form or construction and is designated as a single pole, single throw switch including a supporting bracket 40 secured through an attaching member, rivet or the like, 41 to the endless belt 31. Each switch bracket 40 includes a base 42 from one side of which extends the attaching means 41 while against the opposite or outward face of the base is a switch slide 43. The switch slide 43 is adapted to be vertically shifted which movement, as seen in FIG. 3, is effected through a spring 44 extending between the said slide 43 and a switch actuator 45. The switch actuator 45 is adapted to be oscillated on a trunnion or pin 46 extending through the actuator and through supporting arms 47 of the switch supporting bracket and which extend outwardly from the switch bracket base 42. The switch actuator 45 is provided with a pair of seats 48 and 49 adapted to be alternately engaged by and upon operation of the switch operating mechanism plunger 20.

The switch slide 43 has secured to its upper end a switch or contact plate 50 adapted to co-operate with contacts 51 and 52 for bridging same and permitting a current flow therebetween. The contacts 51 and 52 are secured in spaced relation to one another to a carrier 53 formed of insulating material and which carrier 53 is connected to the underside of the bracket horizontal arm 25 as clearly illustrated in FIGS. 2 and 3.

As shown in FIG. 3 the contact 51 has connected therewith one end of an electrical current conductor 54 while the contact 52 is shown as having connected with it a conductor 55 in turn, see FIG. 2, having connected with it a wire or lead 56 that terminates in a lamp 17.

The contact 51 is a continuous buss bar while the contacts 52 may be a segmented buss bar with each segment separated from the others and there are as many said separate or segmented buss bar contacts as there are lamps 17 wherefore a separated segment of buss bar or sliding contact 52 is provided for each lamp 17.

In practice the endless belt 31 is advanced in a given direction, toward the left as in FIG. 6, thereby advancing the switch mechanism successively from one segmented buss bar or sliding contact 52 to the next while maintaining continuous contact with the continuous buss bar 51. From this it follows that the lamps in a horizontal row are successively illuminated as the switch advances from right to left in FIG. 6.

Any suitable or desirable means may be employed for effecting the advancing movement of the belt 31 that shown in the drawings comprising a solenoid coil 57 associated with the shaft 30 for intermittently energizing a ratchet mechanism 58. The arrangement of these parts being such that the coil 57 and ratchet 58 advances the belt 31 from one lamp to the next at each impulse or activation thereof. In order that the said solenoid and ratchet be energized the said solenoid 57 has one side thereof connected to ground while its other side is connected by a wire 59, a make and break switch 60, and a wire 61 to a source of electric current, preferably a direct current source or voltage. The make and break switch 60 is operated by a plunger 62 associated with a solenoid 63 in turn having one end of its coil connected to ground while the other end thereof is connected through a wire 64 and a make break switch 65 with the wire 61 and the D.C. voltage. The make-break switch 65 is intermittently closed by a cam 66 secured to and continuously rotated by the shaft 67 of an electric motor 68 connected preferably with an alternating current source or voltage by the wires 69.

The continuous buss bar 51 has its electric conductor or wire 54 connected with the direct voltage current wire 61 and through the switch mechanisms 39 with one side of the lamps 17 while the other side of said lamps 17 are connected with a wire 70 that is connected to ground and whereby, when a switch mechanism 39 is completed, the circuit to the said lamps is individually maintained.

From the foregoing it will now be understood that there is provided a switch mechanism behind each lamp 17 and it is to be noted that each lamp has associated therewith a switch operating plunger 20 wherefore said switches may be actuated through any light plunger in a horizontal line. It should further be noted that the switches are of the variety known as "push-push-ON-OFF" switches. In other words the operation of a lamp plunger would, for example, operate the switch to illuminate the light and return to a neutral position whereupon a second push operation on the lamp plunger would extinguish the lamp. Since the arrangement is such that each switch is subsequently aligned with each lamp plunger the said switch can be operated to illuminate or extinguish the lamp at any point in a horizontal row, all as will be presently further defined.

As will be noted from FIG. 6 the entire length of the belt 31 is provided with switches each equally spaced from adjacent switches but the switches, at any given time, immediately behind a push lamp are the only ones that can be closed for illuminating or extinguishing a lamp and conveniently this is arranged to take place for the outward reach of the belt. In the operation of the device, again as will be presently made clear, the switches are to be opened as they pass the last light. Any suitable or desirable means may be employed for this purpose, that shown diagrammatically in FIG. 6 comprising a member including a stem 71 and an arm 72 with said arm positioned to operate on the switch actuator 45 and which operation would be such that the actuator 45 is oscillated or actuated to the opposite position from that shown in FIG. 3 and which would be the switch-off-position, if the switch actuator is in the position shown in FIG. 9 it would not be actuated by the means 71–72.

In practice the motor 68 is such that a complete or single revolution of its shaft 67 takes place in a given elapsed period of time, such as two and one-half minutes. In this circumstance the make and break switch 65 would be closed, momentarily, every two and one-half minutes for energizing the solenoid 63, closing the switch 60, and energizing the solenoid coil 57 and ratchet mechanism 58. This then would advance the endless belt 31 a given amount every two and one-half minutes, or advance the switch from one lamp to the next every two and one-half minutes. In this connection it should be noted that the relation of the switch plate 50 to the individual segmented buss bar contacts 52 is such that the illumination of any one of the lamps 17 would be followed almost immediately by the extinguishment of the previously illuminated lamp so that the illumination of more than one lamp in a horizontal row is held to an absolute minimum once a lamp in said row has been illuminated. Alternately the relation may be such that the successive lamps are illuminated only after the extinguishment of the preceding lamp but this interval is again held to an absolute minimum so that a single, illuminated lamp, is substantially constantly in operation.

In this connection it should also be noted that the movement of the belt 31 is such that the switches are advanced from position to position at such a rate that a switch is always in position to be operated, that is, it is almost impossible to actuate a switch control device, switch plunger 17–20, without a switch being present to be operated thereby.

The cabinet front or panel 15 is provided at its upper end with a series of windows 73' and which windows would carry indicia and with a window directly above each vertical column of lamps. The said windows 73', in accordance with the above example of motor 68 speed, would each carry a time indication in minutes with such indication two and one-half minutes apart and wherefore said windows are respectively marked, from left to right, 2½, 5, 7½ etc. to and including thirty minutes as presently set up and disclosed in the drawings as an example.

The horizontal rows of lamps are also provided with indicia, which for an example of use to be presently made clear, the markings are from 5 to 25 both inclusive, in increments of 1.

It is to be understood that the horizontal row markings and the vertical column markings would be changed depending upon the use to which the device is to be put.

The device of the present invention is illustrated in the drawings as having been set up to keep a moving record of a moving object, such as an airplane, wherefore an observer would know how far from the observation point the airplane is and approximately how much time remains for the airplane to reach said observation point at any given moment within the control or critical area that the observer is concerned with. For this reason the horizontal row indicating numerals, 5 through 25, may represent thousands of feet of altitude of an airplane.

Specifically, it is to be assumed that an airplane is sighted within thirty minutes from the airport at which the observer is located and that the airplane is 25,000 feet in altitude. The observer in this instance would operate the switch plunger 17–20 in the vertical column under the numeral "30" and in the horizontal row preceded by the numeral 25, said lamp plunger being specifically identified in FIG. 1 by the reference numeral 17a. The closing of the light plunger 17–20 operates the switch associated therewith to the position illustrated in FIG. 2 for thereby connecting or completing the circuit for illuminating the said lamp 17a.

It is to be understood that the control mechanism behind the horizontal row 25 is intermittently operated wherefore within 2½ minutes following closing of the switch plunger 17a, FIG. 1, the lamp immediately preceding it will be illuminated and said lamp 17a extinguished and that each 2½ minutes thereafter the said illuminated lamp extinguished and the preceding lamp illuminated. The observer need, therefore, but glance at the cabinet front or panel 15 to be advised at any time of the position of the airplane, in so far as time to ultimate landing is concerned.

Assuming now that a second airplane is observed at the 20,000 feet altitude and that it is 25 minutes from the airport. In this instance the operator would operate the switch plunger 17–20 in the vertical column under the numeral 25 and in the horizontal row preceded by the numeral 20 whereupon said lamp would be illuminated until the airplane has reached a landing at the point of observation. This last mentioned light plunger is specifically identified by the reference numeral 17b.

Similarly any other airplane within the radius or area under the control of the observer may be set up in the device of the present invention and its movable progress at all times indicated.

If it now be assumed that between the times of observation and the anticipated time of landing it is desired that the plane move away from the originally intended landing point so that the observer need not concern himself therewith any further it is only necessary for the observer to actuate the light plunger 17–20 then illuminated whereupon the switch controlled thereby will be opened extinguishing the lamp and which will not further be illuminated unless deliberately operated.

Specifically, and assuming that the lamp 17b represents the airplane originally twenty-five minutes from the point of observation and that the said airplane is diverted from its course when the same is approximately ten minutes from the said point of observation. The lamp plunger 17–20, specifically identified by the reference numeral 17c, in the vertical column of lamps headed by the numeral 10 and in the horizontal row of lamps preceded by the numeral 20, is then operated, which as noted above, opens the switch to the lamp thereby extinguishing the said lamp 17c and which lamp, along with all that remain in said row, will remain extinguished unless a light plunger 17–20 between 17c and the left hand end of the row 20 is pushed for again illuminating a lamp.

The foregoing description speaks of illuminating and extinguishing the lamps, however, the specific function is the opening and closing of the moving switches which successively illuminate the lamps carried by the cabinet front or panel 15. It is believed obvious, however, that the moving belts may support a plurality of lamps instead of switches and with the switches, per se, carried by the cabinet front or panel and when one switch is closed each of the succeeding switches in the row will be correspondingly closed while each switch similar to each lamp will be open if the switch or lamp immediately ahead of it is open.

In the event the airplane continues to move after its observation and its position entered on the cabinet front or panel 15, until it reaches the airport, the switch initially operated will be automatically opened by the switch opener 71–72.

It is to be noted and understood that instead of a solenoid operated ratchet, such as 58 above, for intermittently and angularly moving the shaft 32, belt 31 and switch 39, a standard and well known step operated motor may be employed. This type of mechanism is well known and may be exemplified by a "Ledex" rotary solenoid motor as made and distributed by Ledex, Inc., Dayton, Ohio.

Figure 4:
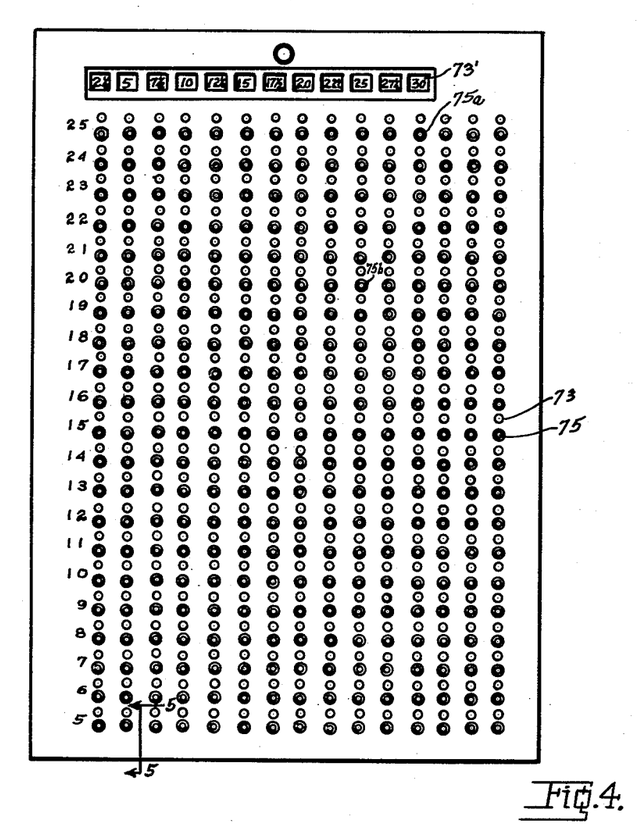
FIG. 4 is an elevational view of a device of the present invention showing a modification in the general arrangement thereof.

The modified structure disclosed in FIGS. 4 and 5 contemplates a separate plunger and lamp mechanism. As shown, particularly in FIG. 5, the lamp 73 is mounted in a lamp socket 74 connected by a wire 56 with the segmented buss bar or separate slide contact 52. As will be seen from FIG. 4 the said lamps 17 are arranged in a horizontal row in substantially the same manner as the said lamps are arranged in FIG. 1.

The operating mechanism or plunger however consists of a cap member 75 separate and apart from the lamp 17 with said cap having projecting therefrom the rod or plunger 76 encircled by a spring 77 which normally retains the said plunger 76 and its cap 75 in the neutral or inoperative position; the spring 77 is shown as abutting on one end with the base of a counter-bore in the cap 75 and abutting on its other end with the depending flange 24 of bracket 22.

The plunger 76 co-operates with a switch actuator 45 of the switch mechanism substantially identical with the push-push switch above described.

Figures 8, 10:
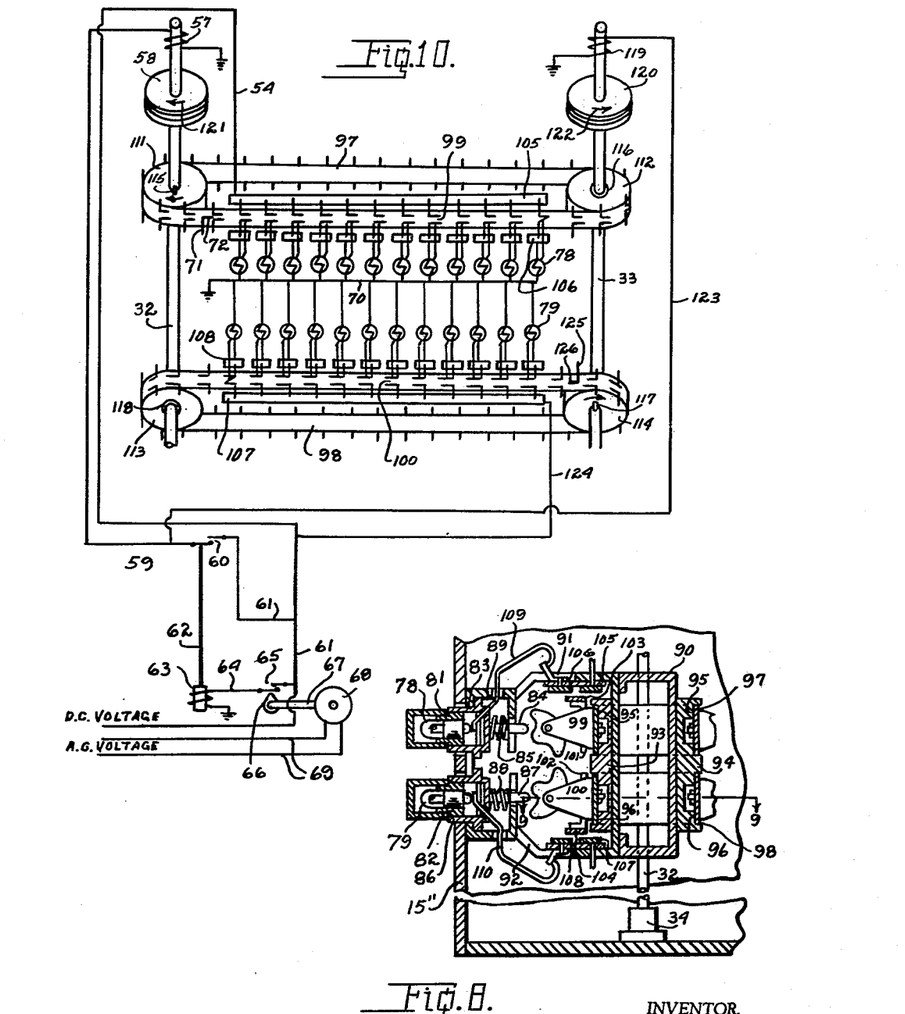
FIG. 8 is a view similar to FIG. 2 showing on an enlarged scale a mechanical structure of means employed with the modified disclosure in FIG. 7 as seen from line 8—8 on said FIG. 7.
FIG. 10 is a diagrammatical view similar to FIG. 6 showing the mechanical and electrical circuit involved in the modification of FIG. 7.

The circuit of FIG. 6, above described, is actually the circuit involved in the mechanism of FIGS. 4 and 5 since the said circuit diagrammatically includes a plunger 76 separate from the lamp but it is obvious from FIG. 6 that if the lamps there illustrated, and as illustrated in the upper part of FIG. 10, were movable they would contact and move the plunger and thereby close the switch. In connection with the electrical diagram in FIG. 6 it should be noted that the switch member slide 43, as structurally illustrated in FIGS. 2, 3 and 5 is illustrated in FIG. 6 as a pivoted contact member which is electrically connected with the said segmented buss bar sections or separate slide contactors 52 while the elongated or continuous buss bar 51 is shown as having an electrical contact extending therefrom. Further, as shown in FIG. 6, the third switch from the right hand end is shown as being closed this would correspond with either switch 17a or 17b of FIG. 1 or, corresponding with switch 75a or 75b in FIG. 4.

The foregoing modifications deal with, as the title of this application indicates, with events that are to take place within a time band and toward a conclusion of the event.

In the modification illustrated in FIGS. 7 to 10 it is contemplated that certain moving events may take place in a succeeding time interval as distinguished from the event being accomplished or effected in a time cycle wherein the time diminishes. Accordingly the panel or cabinet front 15' in FIG. 7 discloses a plurality of pairs of horizontal rows of lamps respectively identified by the reference numerals 78 and 79 which for convenience and space saving may be similar to the construction illustrated in FIGS. 1, 2 and 3.

As illustrated in FIG. 8 the lamps 78 are each mounted in a socket 81 while the lamps 79 are each mounted in a socket 82. The said lamps 78 and 79 and their respective sockets each form the operating mechanism of a push-push-ON-OFF switch.

As first noted, the lamps 78 and 79 are similar to the lamp switch actuating mechanism construction of FIGS. 1, 2 and 3 and wherefore the lamp 78 and its socket 81 are a part of a plunger housing mechanism 83 from which extends the plunger, per se, 84 held in normal or inoperative position by a spring 85. Similarly, the lamp 79 and its socket 82 are carried by and form a part of plunger housing 86 from which extends the plunger 87, held in its normal inoperative position by a spring 88.

The lamp and switch operating mechanism extend through suitable apertures in the cabinet front or panel 15" and are further associated with and carried by a bracket 89 that extends transversely of the said cabinet front or panel 15" in the same manner that bracket 22, above, extends with respect to cabinet front or panel 15.

A second boxlike bracket 90, secured to the bracket 89 through arms 91 and 92, has, in turn, secured to the outer face thereof a track 93 and has secured to its inner face a track 94. The tracks 93 and 94 are each provided with an upper trackway 95 in alignment with one another and said tracks are further each provided with a lower trackway 96, likewise in alignment with one another, and with said trackways, respectively, receiving and guiding endless belts 97 and 98. The said belts 97 and 98 each have secured thereto a plurality of switch mechanisms, such as disclosed in FIG. 8, and wherein said individual switch mechanism are, respectively, indicated in its entirety by the reference numerals 99 and 100 and which switch mechanisms are substantially identical with the switch mechanism 39 above described, and each switch mechanism including a switch slide 101 and 102, respectively, having at one end thereof, as seen in FIG. 8, respectively, the upper arm carrying bridging contact 103 and the lower slide arm carrying bridging contact 104.

The bridging contact 103 is adapted to bridge or connect a continuous buss bar contact 105 and a segmented bar or individual sliding contact 106 while the bridging contact 104 is adapted to connect a continuous buss bar contact 107 and a segmented bar or individual sliding contact 108 with said contacts 107 and 108 being carried by and through an insulated carrier on the bracket arm 92 while the contacts 105 and 106 are similarly carried by and through an insulated carrier on the bracket arm 91.

The segmented or individual contacts 106 are, respectively, each connected with a lamp 78 through a wire or conductor 109 while the segmented or individual contacts 108 are, respectively, connected with a lamp 79 through a wire or conductor 110.

In practice the endless belt 97 carrying the switches 99 is mounted on drums 111 and 112, see FIG. 10, while the endless belt 98, carrying the switches 100, is similarly mounted about drums 113 and 114. The drums or pulleys 111 and 113, as diagrammatically illustrated in FIG. 10, are mounted on the shaft 32 while the drums or pulleys 112 and 114 are mounted on or associated with shaft 33. The said belts 97 and 98 are actuated in opposite directions namely the belt 97 is driven by the drum or pulley 111 which is rotated in a clockwise direction while the belt 98 is driven or rotated by the pulley or drum 114 which is driven in a counter-clockwise direction. For this reason the pulley or drum 111 is keyed, as at 115, to the said shaft 32 while the pulley or drum 112 is freely mounted on the shaft 33 through a bushing 116, and, conversely, the drum or pulley 114 is keyed as at 117 to the shaft 33 while the pulley or drum 113 is freely mounted on shaft 32 through a bushing or sleeve 118.

From this it follows that even though the shaft 32 is rotated in a clockwise direction carrying with it the drum or pulley 111 the drum or pulley 113 is not moved thereby and conversely the rotation of the shaft 33 in a counter-clockwise direction carries with it only the drum or pulley 112. Consequently, also, the said drums or pulleys 111 and 112 along with the belt 97 may be operated or actuated in one direction while the pulley or drums 113 and 114 along with the belt 98 are operated in an opposite direction.

The shaft 32, as illustrated in FIG. 10, is rotated or actuated in the same manner as above set forth, namely, through an intermittently energized solenoid coil 57 associated with, for intermittently operating, a ratchet mechanism 58. To rotate the shaft 33 a similar but oppositely operating mechanism is employed, namely, a solenoid coil 119 associated with for operating a ratchet mechanism 120. The direction of rotation of the ratchet mechanism 58 is, as noted above, in a clockwise direction as indicated by the arrow 121 thereon while the ratchet mechanism 120 is actuated in a counter-clockwise direction as indicated by the arrow 122 thereon.

In order to energize the solenoid coil 119 it has one end thereof connected by a wire 123 to the wire 59 ahead of the make break switch 60. The other end of the solenoid coil 119, similar to the solenoid coil 57, is connected to ground.

The continuous contact or buss bar 107 is connected with the wire 61 through a wire 124 while the segmented or sliding contacts 108 each has connected therewith one side of the filament in a lamp 79 while the other side of the lamps are connected to the ground wire 70.

Figure 7:
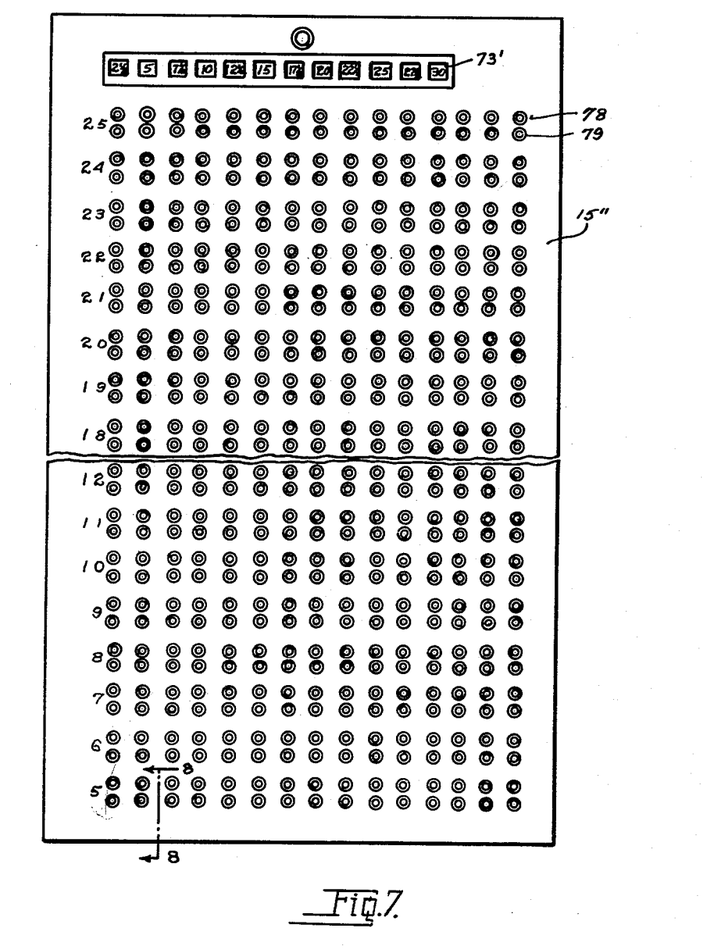
FIG. 7 is a fragmentary, elevational view of a device embodying the principles of the present invention and showing a further modification in the general arrangement over the disclosures in FIGS. 1 and 4.

From the foregoing it will be noted that the endless belts 97 and 98 are actuated in reverse directions, that is, the forward reaches of the belts 97 travel from right to left as seen in FIG. 10 while the forward reaches of the belts 98 travel from left to right. Correlating this with the cabinet front or panel 15" the lower row of lamps in each of the rows preceded by the numerals 5 through 25 has the lamps successively illuminated when moving from the left to the right while the upper row of each of said double rows of lamps has its individual lamps successively illuminated from right to left. In other words the lower row of lamps may commence at the vertical row marking 2½ and advance to 30 while the upper row may commence at or even before the vertical row under 30 and proceed downwardly to 2½.

It will also be noted that the lamp plungers 78–84 and 79–87 may be operated at any point between the extremes and the lamps either preceding the same or succeeding the same will then be illuminated. By the same token should it be desired to remove the intelligence from the device the illuminated lamp may be extinguished and thereby prevent the lamps to be next illuminated from operating.

A concrete example, in line with the above, may be illustrated by assuming an airplane is sighted 30 minutes from an airport or point of control and at, for example, 24,000 feet the operator would depress the lamp or switch control 78–84 in the vertical column under "30" in the upper set of lamps in the horizontal row "24" and thereby illuminate the lamp indicated by the reference numeral 78a and proceed to forget about it since all he would have to do would be glance at the cabinet front or panel to know where the said airplane would be. Assuming now that an airplane is departing from the airport at about the time of observance of the plane thirty minutes from the airport the operator would then depress or actuate the lamp or switch control 79–87 in the column under the "2½" and, again, if desired, in the lower set in the row "24" and illuminate the lamp at this point, such as lamps 79a and again proceed to forget about it since a glance at the cabinet front or panel would again inform him of the progress of the airplane away from the airport or point of observation. It will be understood that the adjacent lamps in the direction of movement of the airplanes would be successively illuminated at definite intervals such as 2½ minutes, or units of time, in the progress of the said airplanes.

Again, and in line with the above example, and assuming that the airplanes deviate from the intended pattern so that the observer need not further concern himself with the airplanes it is only necessary at this point to operate the lamp or switch control of the then illuminated lamp whereupon further tracking is prevented or the memory erased from the device.

In the event the departing plane continues on schedule, the switch mechanisms 100, similar to the switch mechanisms 99, corresponding to the above indicated switch mechanism 39, are automatically opened at the remote end of their travel by a switch opener, in all respects similar to that above described, and including an arm 125 from which extends a finger 126.

To further assist the operator in his control and observation of the movement of the airplanes the lamps in each row of each pair of parallel rows could be of a different color, namely, the lamps 78 could be red to indicate an airplane coming in, or time to go, to the airport or point of observation, while the lamps 79 could be green to indicate the time elapsed since the commencement of the airplane flight or the time the airplane has been in flight.

The foregoing has dealt with the use of the device in connection with the tracking of and information pertaining to airplanes to and from an airport or point of observation. It is believed obvious that the device of the present invention could be readily adapted to the control and observation of moving trains to and from a railroad station, classification yards, or division points. The device of the present invention may be employed for carrying forward manufacturing processes, such as the time or point at which temperatures should be increased or decreased, the time or point in the process when additional ingredients are to be introduced or byproducts taken off, or in the control of the process when batches of different quantities are being handled. The device of the present invention can also be employed as a counter such as counting decades or multiple units.

In each of the above examples the device is employed as a "moving events display" or "a traveling memory" relieving the operator or control individual of the necessity of remembering when the several events in a chain are to be effected since a glance at the panel will readily inform him of the time that the said action on his part should be effected. It will further be noted that the device, at the conclusion of the event, or after the function has been completed, is cleared of any memory thereof, that is, the closed switch or switches are automatically opened, and remains clear until subsequent new data is positively fed or initiated into the device.

It is believed obvious that the indicia at the upper end of the panel and above the vertical rows of lamps would be readily changed to accommodate the particular use to which the device is being put and likewise the indicia to the left and/or right hand side of the horizontal rows of lamps likewise changed or made appropriate to the particular problem being handled.

From the foregoing it is believed now obvious there has been provided a device for accomplishing the objects initially set forth.

What is claimed is:

1. In a device of the class described for tracking the progress of a moving event, the combination comprising:
   a panel;
   a plurality of electric lamps mounted on and extending through said panel and arranged in a row, said lamps being successively illuminable to track the present position of a moving event, said lamps having electrical contacts for connection to a source of electric power;
   an endless belt mounted behind said panel, said belt being rotatable about two points spaced at distances at least coextensive with said row of lamps, the parallel reaches of said belt being parallel to and adjacent said row;
   a source of electric power for illuminating said lamps, said source being connected across the electrical contacts of each of said lamps through any one of a plurality of switch mechanisms, each of said switch mechanisms including at least a first contact element mounted on said belt, said first contact elements being spaced around the entire belt at distances equal to the spacing of the respective lamps in said row, each of said contact elements being movable from a first position to a second position in a direction transverse to the direction of movement of the parallel reaches of said belt;
   a second contact member for each lamp, said second contact member being fixedly mounted from said panel adjacent said belt and opposite a respective lamp, said second contact being in electrical connection with a first contact when that first contact is at the respective lamp and is in said second position;
   and means on said panel at each lamp for selectively moving any one of said first contacts to a first or second position.

2. The invention as defined in claim 1, and motive means for moving said belt at regular intervals a distance equal to the spacing of said lamps.

3. The invention as defined in claim 2, and means on said panel at the end of said row of lamps for automatically returning any of said first contacts in a second position to its first position.

4. The invention as defined in claim 2 wherein a plurality of parallel rows of lamps are mounted on said panel, and a similar plurality of belts are similarly mounted with respect to said rows, single motive means being utilized for moving all of said belts.

References Cited by the Examiner

UNITED STATES PATENTS

| | | | |
|---|---|---|---|
| 1,090,989 | 3/14 | Kelley | 324—334 |
| 1,094,083 | 4/14 | Meyer | 340—339 |
| 1,096,779 | 5/14 | Clement | 340—334 |
| 1,110,872 | 9/14 | Borschneck | 340—334 |
| 1,155,466 | 10/15 | Bickley | 340—339 |
| 1,687,391 | 10/28 | Samminiatelli | 340—334 |
| 1,769,060 | 7/30 | Hendry | 340—334 |
| 2,885,664 | 5/59 | McCue | 340—339 |
| 2,903,685 | 9/59 | Buchanun | 340—334 |

NEIL C. READ, *Primary Examiner.*